US009060470B1

(12) United States Patent  (10) Patent No.: US 9,060,470 B1
Donaldson  (45) Date of Patent: Jun. 23, 2015

(54) PLANT SUPPORT SYSTEM

(76) Inventor: Michael Tavis Donaldson, Santa Rosa, CA (US)

( * ) Notice: Subject to any disclaimer, the term of this patent is extended or adjusted under 35 U.S.C. 154(b) by 522 days.

(21) Appl. No.: 12/931,290

(22) Filed: Jan. 28, 2011

Related U.S. Application Data

(63) Continuation-in-part of application No. 12/803,628, filed on Jun. 30, 2010, now abandoned.

(51) Int. Cl.
    *A01G 17/06* (2006.01)
(52) U.S. Cl.
    CPC ..................................... *A01G 17/06* (2013.01)
(58) Field of Classification Search
    CPC ......... A01G 9/12; A01G 9/122; A01G 9/124; A01G 9/126; A01G 9/128
    USPC ........... 47/44–47, 70; 138/114; 403/350, 383, 403/109.1
    See application file for complete search history.

(56) References Cited

U.S. PATENT DOCUMENTS

| | | | | |
|---|---|---|---|---|
| 291,569 | A * | 1/1884 | Borner | 47/47 |
| 918,579 | A * | 4/1909 | Murch | 248/353 |
| 3,107,900 | A * | 10/1963 | De Paolo | 256/65.08 |
| 3,307,305 | A * | 3/1967 | Atkinson, Jr. | 52/111 |
| 3,471,968 | A * | 10/1969 | Letz | 47/47 |
| 3,541,322 | A * | 11/1970 | Bennett | 362/121 |
| 4,053,140 | A * | 10/1977 | Clemens et al. | 256/19 |
| 4,153,380 | A * | 5/1979 | Hartman | 405/39 |
| 4,377,053 | A * | 3/1983 | Roark et al. | 47/42 |
| 4,540,160 | A * | 9/1985 | Zanavich et al. | 256/19 |
| 4,653,142 | A * | 3/1987 | Upton | 16/429 |
| 4,703,584 | A * | 11/1987 | Chazalnoel | 47/46 |
| 4,922,653 | A * | 5/1990 | Stone | 47/45 |
| 5,349,780 | A * | 9/1994 | Dyke | 47/47 |
| 5,542,209 | A * | 8/1996 | Sheu | 47/44 |
| 5,605,010 | A * | 2/1997 | Furlong et al. | 47/48.5 |
| 5,711,107 | A * | 1/1998 | Louisiana | 47/45 |
| 5,881,495 | A * | 3/1999 | Clark | 47/48.5 |
| 5,913,477 | A * | 6/1999 | Dean | 239/289 |
| 6,065,899 | A * | 5/2000 | Adams et al. | 403/397 |
| 6,142,453 | A * | 11/2000 | Martin | 256/65.05 |
| 6,227,752 | B1 * | 5/2001 | Friedrich | 403/192 |
| 6,311,428 | B1 * | 11/2001 | Marino et al. | 47/46 |
| 6,685,154 | B1 * | 2/2004 | Blyth et al. | 248/512 |
| 6,857,247 | B2 * | 2/2005 | Adams | 52/656.9 |
| 7,735,259 | B2 * | 6/2010 | Rich et al. | 47/47 |
| 2001/0011693 | A1 * | 8/2001 | Butterfield et al. | 248/188.5 |
| 2004/0068925 | A1 * | 4/2004 | Puspurs | 47/45 |
| 2005/0039395 | A1 * | 2/2005 | Schwartz | 47/47 |
| 2009/0077879 | A1 * | 3/2009 | Lisciotti et al. | 47/47 |
| 2010/0005715 | A1 * | 1/2010 | Allsop et al. | 47/47 |
| 2010/0043284 | A1 * | 2/2010 | Smith et al. | 47/70 |
| 2010/0325950 | A1 * | 12/2010 | Kassouni | 47/45 |
| 2012/0159844 | A1 * | 6/2012 | Davis | 47/45 |

FOREIGN PATENT DOCUMENTS

GB  1486967 A * 9/1977 ............. A47H 1/022

* cited by examiner

*Primary Examiner* — Joshua Huson
(74) *Attorney, Agent, or Firm* — Risto A. Rinne, Jr.

(57) ABSTRACT

An apparatus for the support of branches and fruit during growth of plants, bushes, and shrubs includes a first rod and a second rod that cooperate for form an upright rod assembly. The first rod includes a hollow elliptical or oval shaped center and the second rod includes an elliptical or oval shaped exterior When the second rod is disposed in the first rod and is rotated, a portion of the exterior of the second rod binds against a portion of the interior of the first rod to secure the first and second rods together. During use, a bottom of the first rod is secured to an upright post and a plant is secured to the upright rod assembly. Alternately, the bottom of the first rod is attached to a soil tip which is then inserted into soil. Various clips for attachment of horizontal members, cords, and wires are provided.

16 Claims, 11 Drawing Sheets

PLANT SUPPORT SYSTEM

This is a continuation-in-part of currently pending patent application Ser. No. 12/803,628, entitled Pivoting Plant Support System, that was filed on Jun. 30, 2010 by the same inventor and it claims the benefit of priority thereof. The entire content of patent application Ser. No. 12/803,628 is included by reference, herein.

BACKGROUND OF THE INVENTION

1. Field of the Invention

The present invention, in general, relates to agriculture and, more particularly, to a system that provides support for the growth of vegetation or fruit occurring on plants, shrubs, and bushes.

The present invention is intended for use with the device of currently pending patent application Ser. No. 12/803,628 as well as with other devices or structures that are designed specifically for use with the present invention or with other devices or other structures that are designed for use with any of the numerous variations that are possible for the present invention.

Prior art devices such as a tomato cage include a welded assembly that does not allow for any adjustment in order to provide support for branches or fruit during the growing cycle. The fixed position of the branch or fruit supports associated with prior art devices cannot adjust as growth of the plant is occurring. This can prevent light from reaching the interior branches or fruit of the plant. Present supports also do not well accommodate the increasing size (both height and diameter) of the growth that is occurring.

For example, plants grow and therefore it is desirable to be able to elevate upward the support that is provided as the foliage and fruit develop. In other words, it is desirable to change the height and spread of the structural members that provide support for the plant's foliage and fruit as the height and shape (width) of the plant changes. Prior art devices are unable to do so.

Prior art devices used for the upright support of plants have a fixed length and an upright angle that cannot be easily adjusted as the plant grows. It is desirable to be able to extend and lock in place the length of an upright plant support as the plant grows. It is also desirable to be able to adjust the angle of the upright plant supports as the branches of the plant grow outward from the base of the plant. This allows for the branches of the plant to be supported (i.e. spread more open) in a manner that allows for increased light penetration to the interior branches or fruit of the plant.

It is also desirable to be able to increase the carrying capacity provided by the support structure as the plant grows additional foliage and develops fruit.

It is desirable to provide horizontal supports that extend between two or more upright supports and which provide additional support.

It is also desirable to provide horizontal supports with an adjustable height to accommodate the current height of foliage or fruit.

It is also desirable to provide horizontal supports that extend around a circumference of a plurality of upright supports and which taken together provide a structure that prevents additional unwanted opening of the vertical supports from occurring.

Prior art devices, like tomato cages, also must be applied over the top of the tomato plant. This can damage the foliage of the plant and thereby lessen the tomato yield. It is therefore desirable to install a plant support system at any time during the growth cycle of the plant without incurring damage to the plant.

Accordingly, there exists today a need for a plant support system that helps to ameliorate the above-mentioned problems and difficulties as well as ameliorate those additional problems and difficulties as may be recited in the "OBJECTS AND SUMMARY OF THE INVENTION" or discussed elsewhere in the specification or which may otherwise exist or occur and that are not specifically mentioned herein.

As various embodiments of the instant invention help provide a more elegant solution to the various problems and difficulties as mentioned herein, or which may otherwise exist or occur and are not specifically mentioned herein, and by a showing that a similar benefit is not available by mere reliance upon the teachings of relevant prior art, the instant invention attests to its novelty. Therefore, by helping to provide a more elegant solution to various needs, some of which may be long-standing in nature, the instant invention further attests that the elements thereof, in combination as claimed, cannot be obvious in light of the teachings of the prior art to a person of ordinary skill and creativity.

Clearly, such a plant support system would be useful and desirable.

2. Description of Prior Art

Plant support systems are, in general, known. For example, wood and plastic rods for insertion into the soil are known. While the structural arrangements of the known devices may, at first appearance, have similarities with the present invention, they differ in material respects. These differences, which will be described in more detail hereinafter, are essential for the effective use of the invention and which admit of the advantages that are not available with the prior devices.

OBJECTS AND SUMMARY OF THE INVENTION

It is an object of the present invention to provide a plant support system that includes one or more adjustable upright rod assemblies for a support of vegetation, flowers and fruit that occur during a growth of plants, shrubs, and bushes.

It is an important object of the invention to provide a plant support system that includes one or more adjustable upright rod assemblies which can be attached to a pivoting base.

Another object of the invention is to provide a plant support system that includes one or more adjustable upright rod assemblies which can be directly inserted into a growing medium.

Sill another object of the invention is to provide a plant support system that includes one or more adjustable upright rod assemblies which include a means to adjust a length of any of the upright rod assemblies.

Still yet another object of the invention is to provide a plant support system that can be adjusted in relation to a vertical growth of plants, shrubs, and bushes and also adjusted in relation to a center line of the plant support system.

Yet another important object of the invention is to provide a plant support system that can be adjusted to accommodate a horizontal growth of plants, shrubs, and bushes perpendicular to a vertical center line of the plant support system or plant.

A first continuing object of the invention is to provide a plant support system that can be installed at any time during a growing stage of a plant.

A second continuing object of the invention is to provide a plant support system that is able to use one or more irrigation line clips for an installation and support of an irrigation drip line.

A third continuing object of the invention is to provide a plant support system that can optionally include attachable/detachable clips for securing branches to a plurality of support rods of the plant support system.

A fourth continuing object of the invention is to provide a plant support system with a horizontal rod assembly that can be adjusted to accommodate growth of plants, shrubs, and bushes.

A fifth continuing object of the invention is to provide a plant support system with an adjustable horizontal rod assembly that can be secured (i.e., locked) into position without the use of a tool or specialized component.

A sixth continuing object of the invention is to provide a plant support system with a horizontal rod assembly that can be positioned between a pair of upright rod assemblies to increase overall strength and stability of the upright rod assemblies.

A seventh continuing object of the invention is to provide a plant support system that includes an adjustable horizontal rod assembly which increases strength and stability of an upright rod assembly.

An eighth continuing object of the invention is to provide a plant support system that is able to increase a volume of the plant support system available for a tying and securing of branches from plants, shrubs, and bushes.

A ninth continuing object of the invention is to provide a plant support system that can be used with an existing type of a plant support structure.

A tenth continuing object of the invention is to provide a plant support system that includes at least one upright rod assembly which includes a clamp that allows attachment of upright support poles to a rim of a planting vessel.

An eleventh continuing object of the invention is to provide a plant support system with at least one upright rod assembly that includes a means for adjustment of the overall height of the upright rod assembly.

A twelfth continuing object of the invention is to provide a plant support system that includes at least one upright rod assembly which is adapted for attachment to an upright post.

A thirteenth continuing object of the invention is to provide a plant support system that includes at least one upright rod assembly which can rotate about a center longitudinal axis.

A fourteenth continuing objective of the invention is to provide a plant support system that includes at least one upright rod assembly which has a longitudinal length and includes an outer rod portion that is hollow and a solid lower rod that can be longitudinally disposed where desired in the outer rod.

A fifteenth continuing object of the invention is to provide a plant support system with upright rod assemblies that include a detachable pointed tip for direct insertion into soil.

A sixteenth continuing object of the invention is to provide a plant support system that includes clips for securing horizontal rods thereto.

A seventeenth continuing object of the invention is to provide a plant support system that includes clips for securing cross straps thereto.

An eighteenth continuing object of the invention is to provide a plant support system that includes clips for securing a wire or rope thereto.

Briefly, a plant support system that is constructed in accordance with the principles of the present invention has at least one upright rod assembly that is adapted for attachment to an upright post on a base assembly or to an upright post of any other type of structure or which can be inserted directly into soil. The upright rod assembly includes an outer rod that has a longitudinal length and which is hollow on the inside. A cross-sectional shape of the hollow interior taken perpendicular to the longitudinal length is elliptical or oval. An inner rod exterior includes a similar oval or elliptical shape and is smaller than the hollow interior of the outer rod. Therefore, when the main elliptical or oval axis of the outer rod aligns with the main elliptical or oval axis of the inner rod, the inner rod can be longitudinally displaced in the outer rod to provide a desired overall length. When the inner rod is rotated about its center longitudinal axis with respect to the center longitudinal axis of the outer rod, it binds against the interior of the outer rod to secure the position of the inner rod with respect to the outer rod. The plant support system optionally includes one or more horizontal rod assemblies that can be adjusted lengthwise and which are attached at each opposite end to one of the two upright rod assemblies. The horizontal rod assembly is secured in position to the upright rod assemblies with a-pair of pole clips. The pair of pole clips each includes a protruding elliptical or oval post that is inserted into a center bore located at each opposite end of the horizontal rod assembly. The horizontal rod assembly is then rotated to secure the horizontal rod assembly to both of the pole clips. An alternative horizontal support is optionally provided that includes a cross strap which can be tied (secured) to a plurality of strap clips that are each attached to one of the upright rod assemblies or the horizontal rod assemblies. The cross strap includes a plurality of holes for adjusting the length of the cross strap that is between the two upright rod assemblies. Any one of the upright support rod assemblies or any of the horizontal rod assemblies or any of the cross straps can be used to provide support for the plant vegetation. Support can be provided by securing (i.e. tying or fastening) the plant vegetation to any of the structure(s) of the plant support system or by a force of gravity causing the plant vegetation to bear down on any of the horizontal rod assemblies or any of the cross straps. The plant support system also optionally includes a plurality of irrigation line clips for an attachment of irrigation water lines to the upright support rods or to the horizontal rod assemblies.

DETAILED DESCRIPTION OF THE INVENTION

Figure 1:
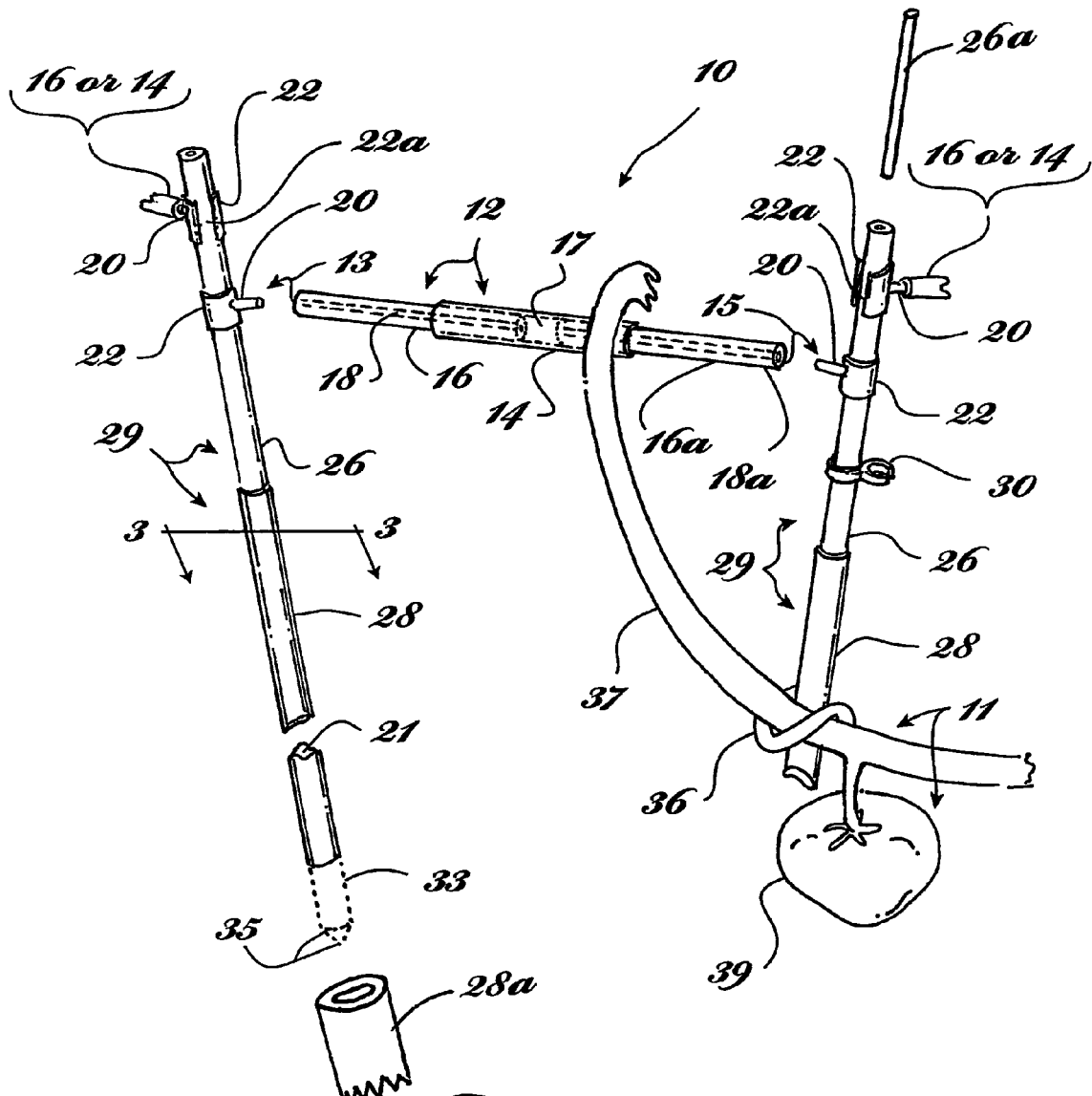
FIG. 1 is an exploded view in perspective of a plant support system showing a pair of upright rod assemblies and an optional horizontal rod assembly disposed between the upright rod assemblies with a pole clip attached to each of the pair of upright rod assemblies.

Referring on occasion to all of the FIGURE drawings and now, in particular to FIG. 1, is shown a plant support system, identified in general, by the reference numeral 10.

The word "plant", as used hereinafter is to include all types of plants, shrubs, foliage, fruit, and bushes, etc.

The reader will notice that reference is occasionally made throughout the DETAILED DESCRIPTION OF THE INVENTION suggesting that the reader refer to a particular drawing FIGURE. The suggestion is at times made when the introduction of a new element requires the reader to refer to a different drawing FIGURE than the one currently being viewed and also when the timely viewing of another drawing FIGURE is believed to significantly improve ease of reading or enhance understanding. To promote rapid understanding of the instant invention the reader is encouraged to periodically refer to and review each of the drawing FIGURES for possible cross-referencing of component parts and for other potentially useful information.

Referring to FIG. 1, the plant support system 10 is shown that is used for the support of plants that includes an upright rod assembly, identified in general by the reference numeral 29. The upright rod assembly 29 includes an inner rod 26 which is disposed within an oval or elliptical center bore 21 of an outer rod 28. The oval or elliptical center bore 21 is revealed when a cross-section of the outer rod 28 is taken that is perpendicular to a center longitudinal axis of the outer rod 28. See also FIG. 3A and FIG. 3B.

The inner rod 26 includes an oval or elliptical shape when a cross-section thereof is taken that is perpendicular to a center longitudinal axis of the inner rod 26. When the inner rod 26 is inserted in the outer rod 28, the longitudinal axes coincide with one another. The outside dimensions (taken in cross-section) of the inner rod 26 are slightly less than the inside dimensions of the outer rod 28. This allows insertion and longitudinal displacement of the inner rod 26 in the outer rod 28. This is described in greater detail hereinafter.

Preferably, the inner rod 26 is also hollow and it includes a longitudinal oval or elliptical center bore. If desired, the inner rod 26 could be solid. The center bore 21 preferably extends the full longitudinal length of the outer rod 28 to provide maximum adjustment range for the inner rod 26.

The oval or elliptical center bore 21 of the outer rod 28 provides many benefits. For example, it can be used for attachment of the upright rod assembly 29 to a base ring (not shown) or to a soil tip 68. See FIG. 10 and FIG. 11. This allows for attachment of the soil tip 68 to a bottom of the outer rod 28 (i.e., to the upright rod assembly 29) and then for direct insertion of the soil tip 68 into a soil 72 an amount sufficient to secure the upright rod assembly 29 in position. If desired, the soil tip 68 could be used with only the outer rod 28 (i.e., not with the upright rod assembly 29 that also includes the inner rod 26). The soil tip 68 and the upright rod assembly 29 are described in greater detail, hereinafter.

The plant support system 10 typically includes one or more of the upright rod assemblies 29. If desired, the inner rod 26 can be removed from the outer rod 28 of the upright rod assembly 29 so that the outer rod 28 (or the inner rod 26) can be used by itself for certain applications. The outer rod 28 can optionally be inserted along its longitudinal length directly into the soil 72 of a pot 74 (or in the soil 72 of an outside garden).

This offers an unexpected benefit in that the outer rod 28 can be used to secure a current height of plant foliage and fruit. When the height of the foliage or fruit exceeds the longitudinal support capability of the outer rod 28, the inner rod 26 can be inserted into the center bore 21 of the outer rod 28. The inner rod 26 can then be displaced within the center bore 21 to a desired height. The position of the inner rod 26 with respect to the outer rod 28 is secured in place by rotating the inner rod 26 within the center bore 21 while simultaneously maintaining the position of the outer rod 28. This causes the elliptical or oval shaped exterior of the inner rod 26 to bind with the elliptical or oval shaped interior of the center bore 21 of the outer rod 28 to secure the attachment of the inner rod 26 to the outer rod 28. Friction between the outside surface of the inner rod 26 and the inside surface of the outer rod 28 is used to maintain a desired overall length of the upright rod assembly 29. When the plant foliage grows an additional amount and it is desirable to further lengthen the overall length of the upright rod assembly 29, the inner rod 26 is grasped and rotated with respect to the outer rod 28 in the opposite direction that was used to secure it in position. When the short and long elliptical axes of the inner rod 26 again align (i.e., coincide) with the short and long elliptical axes of the outer rod 28, the inner rod 26 can be urged in either longitudinal direction with respect to the outer rod 28 until the desired overall length of the upright rod assembly 29 is achieved. The inner rod 26 is rotated about its center longitudinal axis to again secure the inner rod 26 in position with respect to the outer rod 28.

Although it is possible to use the outer rod 28 by itself, it always possible to later insert, from the top, the inner rod 26 and thereby extend the overall length of each of the upright rod assemblies 29. The upright rod assembly 29 can optionally be extended in longitudinal length by attaching an additional outer rod 28 over a remaining upper portion of the inner rod 26 thereby further extending away the overall length of the upright rod assembly 29. As many alternating additional outer rods 28a and additional inner rods 26a can be attached longitudinally to increase the overall length of the upright rod assembly 29 by any desired amount. The outer rod 28 functions as a first rod, the inner rod 26 functions as a second rod, the additional inner rod 26a functions as a third rod and the additional outer rod 28a functions as a fourth rod. Of course, the load carrying capacity of the upright rod assembly 29 is decreased in proportion to its overall length. However, the plant support system 10 provides a variety of optional horizontal structures, as are described in greater detail hereinafter, that can be used to provide additional strength (stiffening) for the upright rod assemblies 29 when two or more of the upright rod assemblies 29 are used.

If desired, the outer rod 28 can be modified to provide a configuration that includes a solid portion 33 (shown in dashed lines, FIG. 1) which can have a pointed tip 35 or a rounded tip for direct insertion into the soil 72 (ground). If the solid portion 33 is included, the center bore 21 extends fully from the top of the solid portion 33 to the top of the outer rod 28. This provides a stronger structure for direct insertion of the outer rod 28 into the soil 72 or ground. The pointed or rounded tip 35 also facilitates insertion of the (modified) outer rod 28 into the soil 72 or ground.

It is preferable to include for most applications more than one upright rod assembly 29 that can be arranged around the base of a plant, identified in general by the reference numeral 11. The portion of the plant 11, as shown in FIG. 1 is comprised of a vine 37 and a tomato 39. Other applications may only need to use one upright rod assembly 29 (or one outer rod 28). If the outer rod 28 is initially used by itself, it is always possible to add the inner rod 26 later to provide the preferred overall length of the upright rod assembly 29 and thereby provide additional support for the growing plant 11.

For the great majority of applications it is anticipated that the plant support system 10 will include more than one upright rod assembly 29 and that, for many applications, a plurality of spaced-apart upright rod assemblies 29 will surround the base of the plant 11. The plant support system 10 allows for even greater support of the plant 11 by including various types of structures that provide horizontal support for the plant 11.

The horizontal structures, which are described in greater detail hereinafter, extend horizontally between the various upright rod assemblies 29, to which the horizontal support structures are secured. Therefore, use of any version of the horizontal support structure requires that at least two of the upright rod assemblies 29 are present. A preferred type of horizontal support structure includes a horizontal rod assembly, indentified in general by the reference numeral 12, as shown in FIG. 1.

While there are many ways that the horizontal rod assembly 12 can be attached to the upright rod assemblies 29, a preferred method of attachment includes a pole clip 22 that is optionally attached to each one of the upright rod assemblies 29 at a desired elevation above the soil 72. Sliding the pole clip 22 up or down along the longitudinal length of the inner rod 26 or along the length of the outer rod 28 provides a method for adjusting the elevational position of the pole clip 22 along the longitudinal length of the upright rod assembly 29.

The pole clip 22 is attached to the upright rod assembly 29 by aligning a longitudinal gap 22a of the pole clip 22 with the longitudinal exterior of the upright rod assembly 29, and then urging the pole clip 22 over either the inner rod 26 or over the outer rod 28 until the pole clip 22 snaps in place. The pole clip 22 is flexible enough to secure it to the inner rod 26 or to the outer rod 28. If desired, different sizes of the pole clips 22 can be provided.

The pole clip 22 is then rotated around the center longitudinal axis of the upright rod assembly 29 into a desired direction. Friction is sufficient to retain the pole clip 22 at the desired elevation and in a desired radial position.

The pole clip 22 includes a post 20 for the attachment of the horizontal rod assembly 12. The post 20 has the same elliptical or oval cross-sectional shape but smaller than that of the inside diameter of the horizontal rod assembly 12. During use, the pole clip 22 on each upright rod assembly 29 is rotated so that the post 20 extends toward an adjacent upright rod assembly 29. As shown in the FIG. 1 drawing, it is desirable to place two pole clips 22 on each upright rod assembly 29 as close in elevation to each other as possible, and preferably on adjacent upright rod assemblies 29 with the post 20 of each pole clip 22 pointing toward the post 20 of the pole clip on the adjacent upright rod assembly 29.

The horizontal rod assembly 12 minimally consists of a first (or outer) horizontal rod 14 and a second (or inner) horizontal rod 16. A portion of the second horizontal rod 16 is disposed within a first center bore 17 of the first horizontal rod 14. A second center bore 18 is provided in the second or inner horizontal rod 16. The second center bore 18 is smaller than the first center bore 17.

While it is possible to use only the first outer horizontal rod 14 and the second inner horizontal rod 16 with the horizontal rod assembly 12, this is not a preferred configuration for the horizontal rod assembly 12 because the first center bore 17 is larger than the second center bore 18. This would preclude the same type of pole clip 22 from being used on adjacent upright rod assemblies 29 to secure opposite ends of the horizontal rod assembly 12 to the post 20 on the pole clip 22. Of course, the pole clips 22 could be provided that include different size oval or elliptical posts 20 to accommodate the different sizes of the first center bore 17 and the second center bore 18.

Therefore, a preferred configuration for the horizontal rod assembly 12 is to include a third inner horizontal rod 16a that is identical to the second inner horizontal rod 16. The third inner horizontal rod 16a is disposed at an opposite end of the first outer horizontal rod 14 as compared to the second inner horizontal rod 16. See also FIG. 4. This ensures that the same size post 20 will engage both sides of the preferred configuration for the horizontal rod assembly 12.

The horizontal rod assembly 12 is mounted to the left post 20 by extending the second inner horizontal rod 16 out of the first outer horizontal rod 14 in the direction of arrow 13 until the second inner horizontal rod 16 is disposed fully over the left post 20. To do so the horizontal rod assembly 12 may need to be rotated about a center longitudinal axis, thereof, until the position of the oval or elliptical shape of the second center bore 18 of the second horizontal rod 16 aligns with the position of the oval or elliptical shape of the left post 20. The third horizontal rod 16a is similarly extended and urged over the right post 20 in the direction shown by arrow 15.

After extending and aligning the oval or elliptical shaped interior of the second horizontal rod 14 and the third horizontal rod 16a with the oval or elliptical shape of the left and right posts 20, the first outer horizontal rod 14 of the horizontal rod assembly 12 is then grasped and rotated about its center longitudinal axis with respect to the posts 20. This causes the oval or elliptical shape of the posts 20 to simultaneously bind with the oval or elliptical shape of the center bore 18 of the second horizontal rod 16 and with a center bore 18a of the third horizontal rod 16a thereby securing, by way of friction, the second and third horizontal rods 16, 16a to their respective posts 20.

The act of continuing to rotate the first outer horizontal rod 14 in the same direction also ensures that the portion of both of the second and third horizontal rods 16, 16a that are disposed within the first center bore 17 will also bind with an interior of the center bore 17 of the first horizontal rod 14. In this way, by one quick rotation of the first outer horizontal rod 14 the overall length of the horizontal rod assembly 12 is set (i.e., locked at the desired overall length) and both opposite sides of the first outer horizontal rod assembly 12 (i.e., the distal ends of the second and third horizontal rods 16, 16a) are simultaneously secured to both of the upright rod assembly 29 posts 20.

Preferably, several of the upright rod assemblies 29 are mounted all around the plant 11 with two pole clips 22 attached to each one of the upright rod assemblies 29. The horizontal rod assemblies 12 are similarly attached to each of the pole clips 22 and then secured in position by twisting the first outer horizontal rod 14 of the horizontal rod assembly 12 until the horizontal rod assembly 12 is secured in the desired position to each of the posts 20 of the two respective pole clips 22.

The horizontal rod assembly 12 can be attached and extended to each one of the plurality of upright rod assemblies 29 installed around the perimeter of the plant 11. The upright rod assemblies 29 and the horizontal rod assembly 12 provide an increase in the overall structural integrity of the plant support system 10. The increase in structural integrity provided by the upright rod assemblies 29, when braced by the horizontal rod assemblies 12, prevents the weight of the plant's 11 foliage and fruit from urging the upright rod assemblies 29 or the horizontal rod assemblies 12 outward.

If several of the upright rod assemblies 29 are disposed around the plant 11 and if every one of the upright rod assemblies 29 is connected to two of the closest (i.e., adjacent) upright rod assemblies 29 by two of the horizontal rod assemblies 12, then maximum structural strength is provided to the plant support system 10 at the elevation of the horizontal rod assemblies 12. An interconnected cage is provided that surrounds the plant 11 and which prevents the upright rod assemblies 29 from flexing outward under the weight of the plant 11.

As many horizontal rod assemblies 12 as desired can be attached to the upright rod assemblies 29 at different elevations above the soil 72 to provide the desired amount of strength and load carrying capacity.

It is also possible to provide a horizontal member (a second of either 12 or 18) that includes hollow center at opposite ends thereof with an elliptical or oval cross-section that can be cut to length and attached by urging opposite ends of the horizontal member over each of the posts 20 of the pole clip 22 and then rotating the horizontal member around its center longitudinal axis to secure the horizontal member to both of the pole clips 22. This provides a horizontal support structure that is also useful for securing any portion of the plant 11, thereto, however the spacing between the pole clips 22 cannot be varied as the plant 11 grows. This option is described in greater detail, hereinafter.

If as the plant 11 continues to grow it becomes desirable to extend the overall length of the upright rod assemblies 29, the inner rods 26 are rotated with respect to the outer rods 28 until the oval or elliptical axes align and then the inner rods 26 are extended and again rotated to secure them in the new extended position.

If it is desirable to pivot the upright rod assemblies 29 outward (for example to better open up the growing plant 11 and allow more light to enter the plant's 11 interior region) then the first outer horizontal rod 14 of each of the horizontal rod assemblies 12 is rotated to release engagement of the horizontal rod assemblies 12 from the upright rod assemblies 29. Then the upright rod assemblies 29 can be pivoted outward (depending on the device that they are mounted to). When the horizontal rod assemblies 12 are secured to the upright rod assemblies 29, it is not possible to pivot the upright rod assemblies 29 outward. After the upright rod assemblies 29 have been pivoted into the desired position and after the overall length of the horizontal rod assemblies 12 has been adjusted (i.e., lengthened) the horizontal rod assemblies 12 are again attached to the upright rod assemblies 29 to secure them in the desired position.

Figure 2:
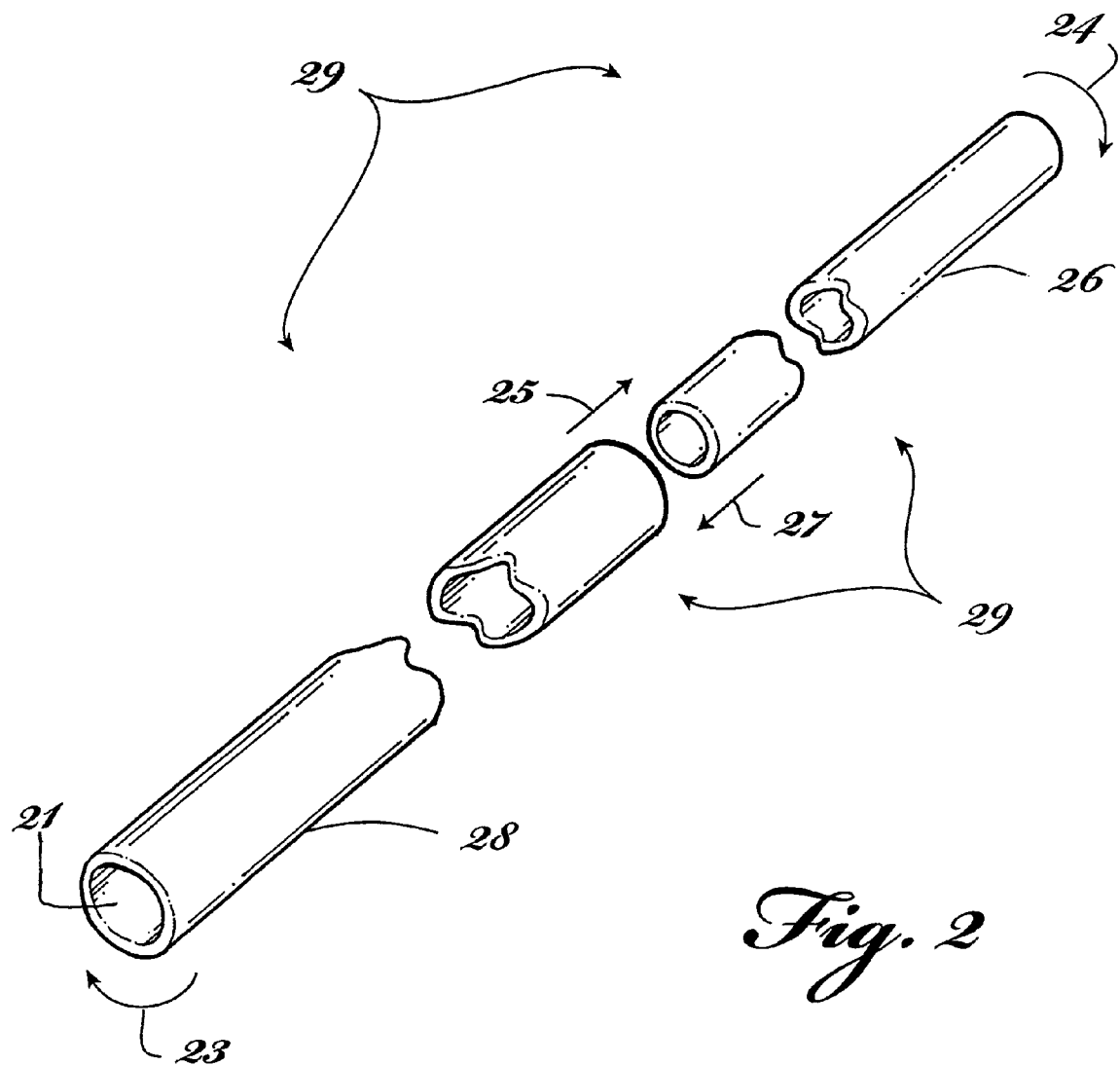
FIG. 2 is a view in perspective of one of the upright rod assemblies of FIG. 1 without the pole clip, showing the means for adjusting the length of the upright rod assembly and securing the length adjustment.

Referring now to FIG. 2, a more detailed explanation of the manner in which the inner rod 26 is secured to the outer rod 28 is described. This same mechanism (i.e., structure and method) is used to establish (i.e., to set and maintain) the overall length of the horizontal rod assembly 12 and to secure the horizontal rod assembly 12 to the posts 20. It is also used to secure the outer rod 28 (or the upright rod assembly 29) to any device that includes a version or type of an upright post. (See FIG. 10 where an extending portion 71 is a type of an upright post). For example, referring to currently pending patent application Ser. No. 12/803,628 that was filed by the same inventor on Jun. 30, 2010 a support rod 26 is disclosed for such attachment. The support rod 26 is attached to a pivot member 24 that permits adjustment of the angle away from vertical that the support rod 26 and the lower rod (identified by the reference numeral 38 in the aforementioned patent application) is attached. The support rod 26 of the aforementioned pending patent application is a type of equivalent of the upright post that can be used to secure the upright rod assembly 29 of the current invention. The lower rod 38 of the aforementioned pending patent application is the equivalent of the outer rod 28 of the current invention.

The inner rod 26 is inserted into the elliptical or oval center bore 21 of the outer rod 28. The center bore 21 includes an interior circumference that is larger than the outer circumference of the inner rod 26 in order to allow telescoping of the inner rod 26 to occur with respect to the outer rod 28. The inner rod 26 is moved in the direction of arrow 25 to increase the length of the upright rod assembly 29.

The inner rod 26 is moved in the direction of arrow 27 to decrease the overall length of the upright rod assembly 29. The adjustment of the length of the upright rod assembly 29 is locked into position by rotating the inner rod 26 in the direction of arrow 24 while simultaneously rotating the outer rod 28 in the direction of arrow 23 (or by not allowing any rotation by the outer rod 28 to occur). It is also possible to secure the length of the upright rod assembly 29 by reversing the above-described direction of rotation. As the plant 11 grows, the upright rod assemblies 29 can be further extended upward to follow the growth of the plant 11.

When the upright rod assembly 29 is fully extended, additional upright rods (not shown) can be added to increase the height of the upright rod assemblies 29 any desired amount. For example, a second outer rod (not shown) can be added to the top of any of the upright rod assemblies 29 so that its bore is disposed over a top portion (end) of the inner rod 26. This provides an unexpected benefit because it also helps to stiffen the inner rod 26, thereby helping to make the resulting upright rod assembly 29 even stronger. As the base of the plant 11 expands with further growth, additional upright rod assemblies 29 and additional horizontal rod assemblies 12 can also be used to further expand the area occupied by the plant support system 10.

If the upright rod assemblies 29 are used in cooperation with a device that allows them to pivot outward (i.e., with the previously described support rod 26 and pivot member 24), then the upper portion of the upright rod assemblies 29 can be pivoted outward to allow horizontal expansion of the plant 11 to occur by ideally changing the position of the upright rod assemblies 29 of the plant support system 10. This provides improved weight bearing support for the plant 11 and it also helps to spread open the plant 11 so that sunlight (or artificial light) can better reach the plant's 11 interior portions, thereby promoting additional growth and yield.

Figure 3A:
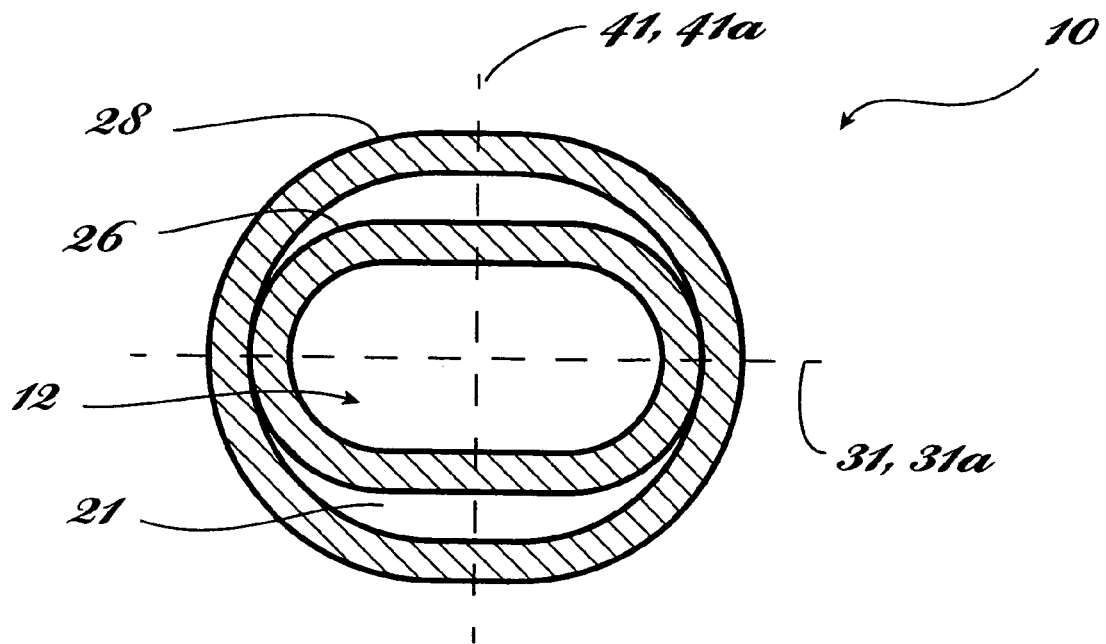
FIG. 3A is a cross-sectional view taken on the line 3-3 in FIG. 1 of the upright rod assembly of FIG. 1 with a first upright rod and a second upright rod disposed in a concentric position with respect to each other that permits telescoping.

Referring to FIG. 3A, a cross-sectional view of the inner rod 26 and the outer rod 28 is shown in a first position that allows the inner rod 26 to move telescopically within the center bore 21 of the outer rod 28. The preferred shape of the inner rod 26 and the outer rod 28, as previously discussed, is elliptical or oval. A first short axis 41 of the inner rod 26 is perpendicular to a first long axis 31 of the inner rod 26. A second short axis 41a of the outer rod 28 is perpendicular to a second long axis 31a of the outer rod 28. In the unlocked position the first short axis 41 and the first long axis 31 of the inner rod 28 are coincident with the second short axis 41a and the second long axis 31a of the outer rod 28.

Figure 3B:
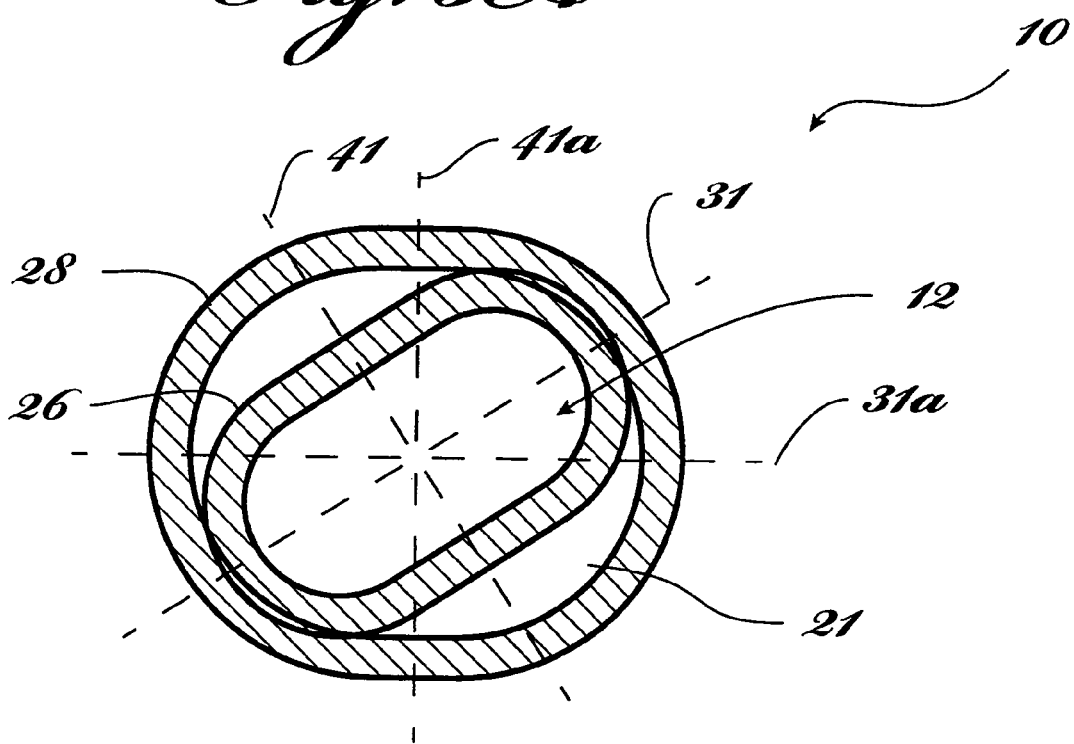
FIG. 3B is a cross-sectional view taken on the line 3-3 in FIG. 1 of the first upright rod and the second upright rod disposed in a locked or rotated position with respect to each other that does not permit telescoping.

Referring to FIG. 3B, a cross-sectional view of the inner rod 26 and the outer rod 28 is shown in a second locked position that binds the inner rod 26 in position with respect to the outer rod 28. When the inner rod 26 and the outer rod 28 are rotated in an opposite direction with respect to each other, the elliptical or oval shape of inner rod 26 binds against the elliptical or oval shape of the center bore 21 of the outer rod 28 with a sufficient amount of friction to secure the inner rod 26 and the outer rod 28 in position with respect to each other. The binding within the center bore 21 occurs along the longitudinal portion of the center bore 21 that is in contact with the inner rod 26. In the second locked position, the first short axis 41 and the first long axis 31 of the inner rod 28 are offset with respect to the second short axis 41a and the second long axis 31a of the outer rod 28.

Figure 4:
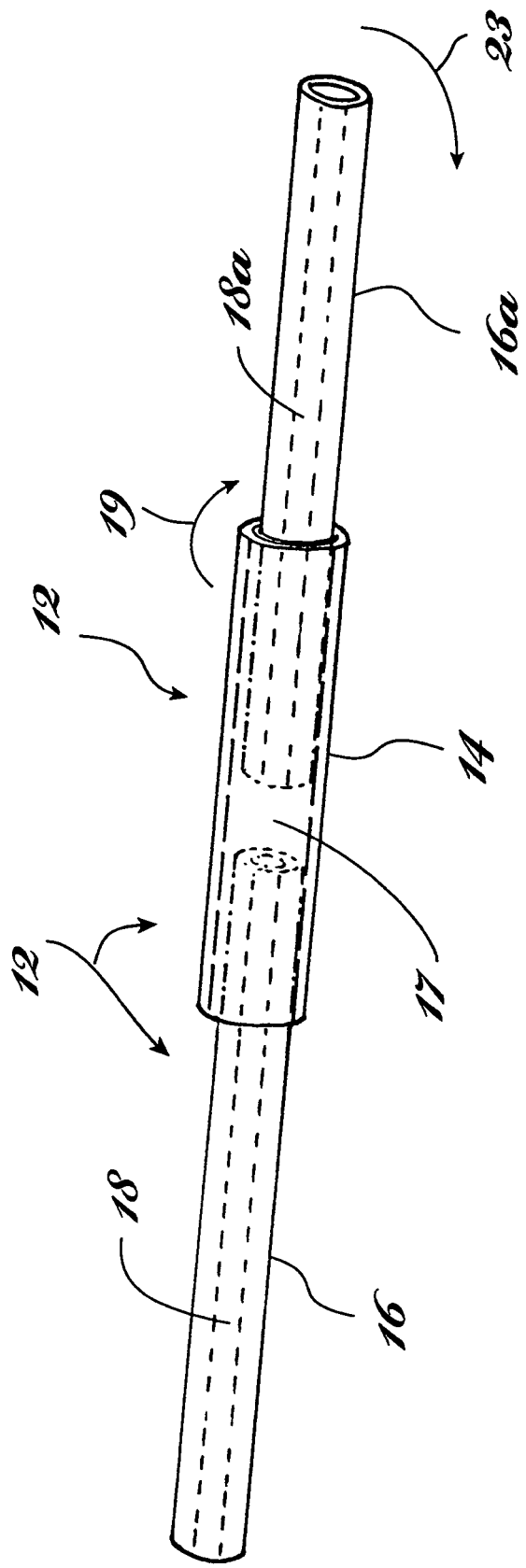
FIG. 4 is a view in perspective of the horizontal rod assembly of FIG. 1

Referring to FIG. 4, a preferred configuration for the horizontal rod assembly 12 is shown that includes the second horizontal rod 16 installed within the center bore 17 at a first end of the first horizontal rod 14. The third inner horizontal rod 16a is installed within the center bore 17 at an opposite second end of the first horizontal rod 14. The first horizontal rod 14 includes the elliptical or oval shaped first center bore 17 that permits the elliptical or oval shaped exterior of the second and third horizontal rods 16, 16a to be inserted within the first center bore 17 to provide a telescoping adjustment for the overall length of the horizontal rod assembly 12.

The length of the second and third horizontal rods 16, 16a is maintained by rotating the second and third horizontal rods 16, 16a in the direction of arrow 23 while simultaneously rotating the first horizontal rod 14 in the direction of arrow 19. If desired, these two directions could be reversed.

It is preferable that the second and third horizontal rods 16, 16a are made of the same material stock (to lower the cost of manufacturing) as is the inner rod 26. It is also preferable that the first horizontal rod 14 is made of the same material stock that the outer rod 28 as is made of. It is also desirable that additives be added, whenever possible, that improve the biodegradability of the plant support system 10 without degrading its structural integrity.

Many modifications to the horizontal rod assembly 12 are possible. For example, a modified horizontal rod assembly (not shown) can be provided wherein a center member is comprised of a length of the same material stock that is used to form the second and third horizontal rods 16, 16a and that a pair of outer members of the modified horizontal rod assembly 12 are comprised of a length of the same material stock that is used to form the first horizontal rod 14. Of course, the size of the oval or elliptical posts 20 on the pole clips 22 would need to be increased to engage with the larger diameter center bore of the pair of outer members.

It is also possible to modify the pole clips 22 and replace the posts 20 with a short protrusion that includes an oval or elliptical opening that extends into the short protrusion. Depending on the configuration used for the horizontal rod assembly 12, either a tip of the second and third horizontal rods 16, 16a or a tip of the first horizontal rods 14 would be inserted into the oval or elliptical opening and rotated to secure (lock) the members in place.

As with the upright rod assembly 29, the horizontal rod assembly 12 can be increased in longitudinal length as much as is desired by adding alternating sections of the first horizontal rod 14 and the second horizontal rods 16, 16a to provide any desired overall length for the horizontal rod assembly 12.

It is also useful to mention the most basic version of the horizontal rod assembly 12 that is possible for attachment at opposite ends to the pole clips 22. If preferred, a desired longer length of the material (stock) used to form the first horizontal rod 14 can be used to provide a fixed-length member that can be attached to the pole clips 22 (with a sufficiently large post 20). Alternately, a desired longer length of the material used to form the smaller diameter second horizontal rod 16 can be used to provide the fixed-length member that can be attached to the pole clips 22 (with the smaller size post 20). Use of the fixed-length member continues to provide the horizontal support structure for supporting the weight of the plant 11 (as shown in FIG. 1) and it continues to permit locking (i.e., securing) the fixed-length member to the adjoining upright rod assemblies 29 (i.e., to the pole clips 22). This provides a very strong overall structure for the plant support system 10. The fixed-length members are also somewhat less expensive to manufacture than would be a comparable length version of the horizontal rod assembly 12. However, the fixed-length members do not permit changing of the spacing (i.e., distance) between the vertical rod assemblies 29 unless a different length of horizontal material is used. A fixed length horizontal support structure is acceptable for use in certain growing situations.

Figure 5:
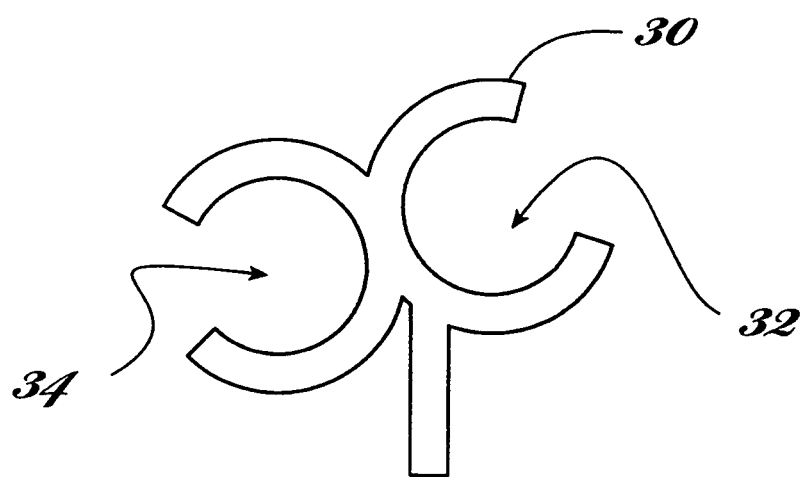
FIG. 5 is a top view of an optional irrigation line mounting clip that can be used to mount an irrigation water line to the horizontal rod assembly or to the upright rod assembly of FIG. 1.

Referring to FIG. 5, an irrigation line clip 30 is shown that preferably includes a first support loop, identified in general, by reference numeral 32, which is adjacent to a second support loop, identified in general, by reference numeral 34. The preferred material for the irrigation line clip 30 is a flexible plastic that allows the first support loop 32 to expand independently of the second support 34. The first support loop 32 is preferably of a diameter that allows for the attachment of the irrigation line clip 30 to the plant support system 10. The second support loop 34 is preferably of a diameter that allows for attachment of an irrigation line (not shown) thereto.

Figure 6:
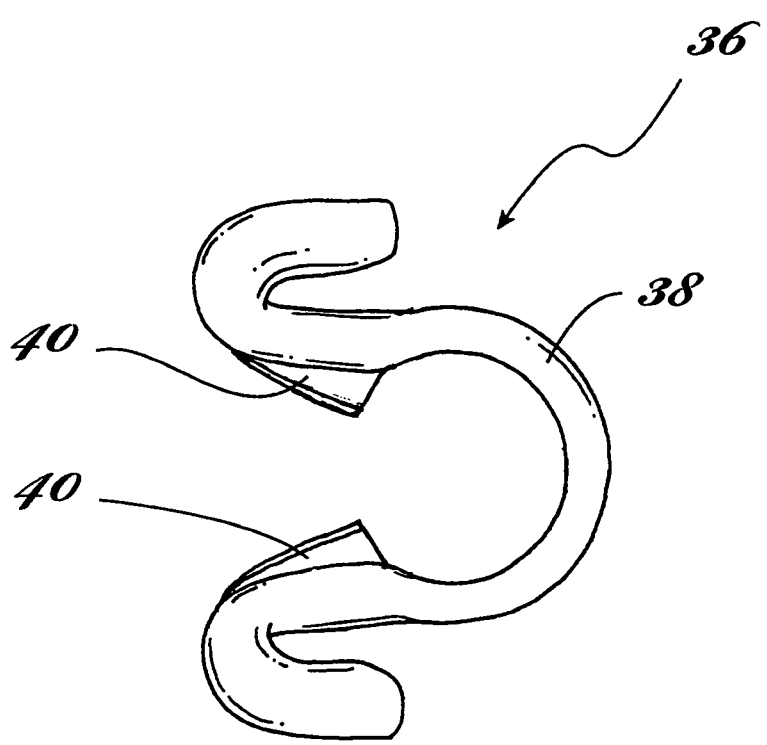
FIG. 6 is a top view of an optional support clip that can be attached to the horizontal rod assembly or to the upright rod assemblies of FIG. 1 with a one-handed method to secure plant vegetation, thereto.

Referring to FIG. 6, a plant support clip, identified in general by the reference numeral 36, is shown that is preferably configured with a loop which forms a support area 38 and includes a pair of protrusions 40 that are located at the narrowest portion of the support area 38. A flat surface of each of the protrusions 40 is disposed adjacent to the other flat surface of the protrusion 40 when the plant support clip 36 is in a quiescent state. The preferred material for the support clip 36 is a flexible plastic that allows the support clip 36 to be urged over a cylindrical surface of the upright rod assembly 29 or the horizontal rod assembly 12 and over a portion of the plant 11 (i.e., over the vine 37, see FIG. 1). The plant support clip 36 may be used to secure branches to the plant support system 10 with a one-handed method. An index finger and a thumb are placed at each opposite end of the plant support clip 36. The index finger and the thumb are then used to expand and urge the portion of the plant support clip 36 that contains the protrusions 40, around the vine 37 and then, in a continuing motion, over an attachment location. Pressure is then released by the index finger and thumb which allows the plant support clip 36 to retract into a quiescent state by way of its own elasticity and hysteresis. In the quiescent state the flat surface of both protrusions 40 are disposed adjacent to each other. This secures the plant 11 to the supporting structure.

It is important to understand that the horizontal rod assemblies 12 (or the fixed-length members) when attached to several of the upright rod assemblies 29 and disposed fully around the plant 11 provide a horizontal surface upon which to place (and secure as desired) portions of the plant 11. It is also important to understand that when the horizontal rod assemblies 12 (or the fixed-length members) extend fully around the plant (360 degrees) that they increase the structural integrity of the plant support system 10 and that they also prevent outward movement (i.e., outward pivoting) of the upright rod assemblies 29. There are other ways of providing similar benefits through the use of other structures adapted for use with the plant support system 10.

Figure 7:
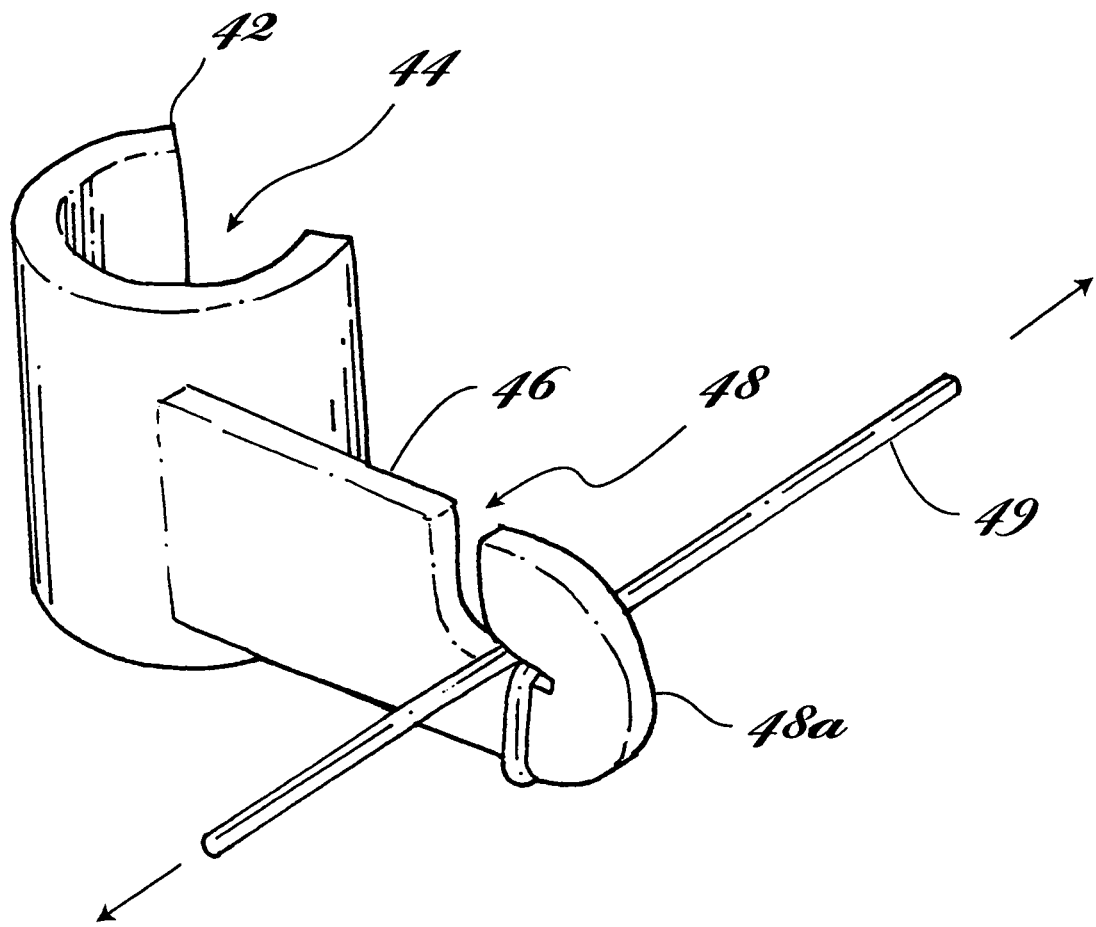
FIG. 7 is a view in perspective of an optional tie clip that includes a clamping area for attaching the tie clip to the upright rod assembly or the horizontal rod assembly of the plant support system of FIG. 1.

For example, referring to FIG. 7, a tie clip 42 is shown that preferably includes a clamping area, identified in general, by reference numeral 44 which is preferably used to secure the tie clip 42 to several of the upright rod assemblies 29 or, if desired, to any of the horizontal rod assemblies 12 of the plant support system 10. Typically, the tie clip 42 is only attached to the upright rod assemblies 29. The preferred material for the tie clip 42 is a flexible plastic that allows the clamping area 44 to expand and then contract when urged around the upright rod assembly 29.

A tie-off protrusion 46 is molded onto an extending side portion of the tie clip 42. The tie-off protrusion 46 includes a cut-out area, identified in general, by reference numeral 48 that is widest at an upper opening and which curves downward and toward a distal tip 48a. The cut-out area 48 tapers to a point as it approaches the distal tip 48a. A length of a flexible cord 49 is urged into the cut-out area 48 and toward the point to secure it in position. If desired. The flexible cord 49 can be wrapped around the tie clip 42 to provide even greater securement to the tie clip 42.

The flexible cord 49 is comprised of any desired type of string, cord, twine, wire, rope or similar material that can be extended horizontally from one upright rod assembly 29 (i.e., from one tie clip 42) to an adjacent (proximal) upright rod assembly 29. The flexible cord 49 provides the desired horizontal support structure for supporting a portion of the plant 11 that is placed over the flexible cord 49. The end of the flexible cord 49 is urged into the cut-out 48 and then is preferably looped around the tie-off protrusion 46 and tied in a knot. The tie clips 42 are preferably attached to each of the upright rod assemblies 29 so that a continuous length of string or twine can encircle the entire plant 11 and be secured to each one the tie clips 42 of each of the upright rod assemblies 29.

The tie clips 42 and the flexible cord 49 provide an especially inexpensive method of providing a horizontal support structure for the plant 11. When the tie clips 42 are attached to each of the upright rod assemblies 29 at approximately the same elevation, and when the flexible cord 49 fully encircles the plant 11, a significant increase in the structural integrity and load-carrying capacity of the plant support system 10 is provided. This type of horizontal support structure is preferred for certain growing applications.

Figure 8:
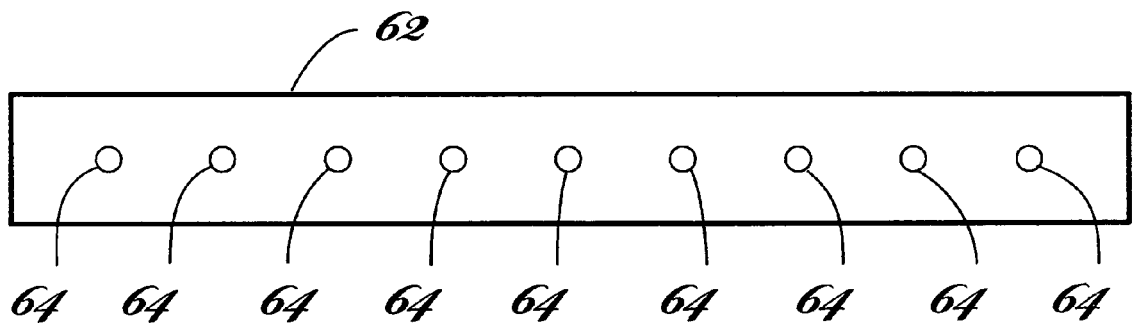
FIG. 8 is a top view of a cross strap to be optionally used with the plant support system of FIG. 1.

Referring now to FIG. 8, a preferred configuration for a cross strap 62 is shown that is used to provide still another type of a horizontal support structure. The cross strap 62 is formed of thin flexible plastic or any other preferred material and it includes a plurality of mounting holes 64. The mounting holes 64 are disposed in a single line along the center of the cross strap 62 for the entire longitudinal length of the cross strap 62.

Figure 9:
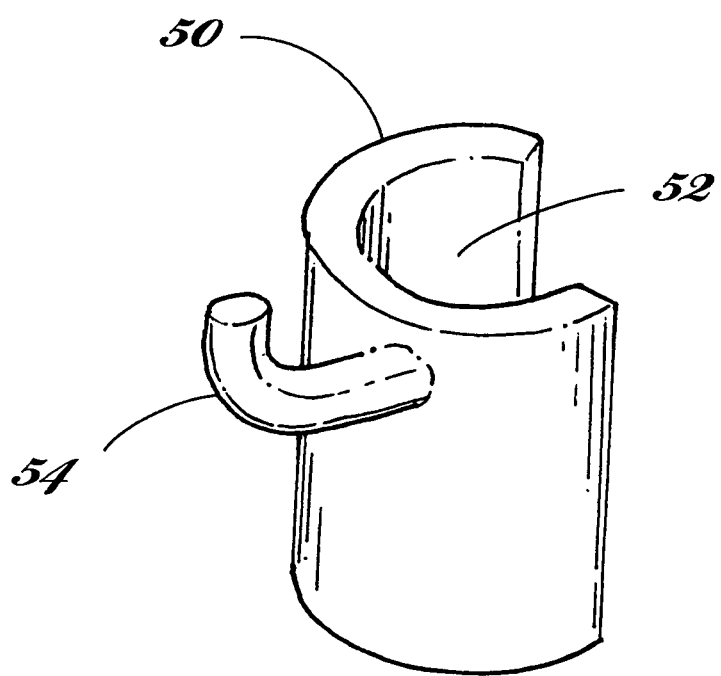
FIG. 9 is a view in perspective of a strap clip for use with the cross strap shown in FIG. 8 as part of the plant support system of FIG. 1.

Referring now also to FIG. 9, any of the plurality of mounting holes 64 are used to attach the cross strap 62 to a support hook 54 of a strap clip 50. The cross strap 62 will preferably be of a length that will allow the cross strap 62 to be extended and attached to a plurality of strap clips 50 with each strap clip 50 attached at approximately the same elevation to one of the upright rod assemblies 29. It is desirable that the cross strap 62 extend to all of the strap clips 50 in one continuous length, however, if desired shorter individual length segments of the cross strap 62 can be attached to any pair of strap clips 50. The cross strap 62 is preferably attached to each of the upright rod assemblies 29 to encircle the entire plant 11. This provides support for the weight of the branches or fruit that is now more equally distributed among all of the upright rod assemblies 29. The cross strap 62 can also be cut to length when used with the strap clip 50 to support a single branch of the plant 11. When used in this fashion, a single mounting hole 64 located at one end of the cross strap 62 is urged down over the support hook 54. The cross strap 62 is then looped around the branch and back to the support hook 54 where any desired mounting hole 64 is again urged down over the support hook 54 to provide support for the branch.

The strap clip 50 is attached longitudinally to the upright rod assembly 29 by using a clamping cavity 52. The clamping cavity 52 produces a press fit around the circumference of the upright rod assembly 29 to maintain a desired position of the strap clip 50. The support hook 54 is preferably molded to the strap clip 50 for securing the cross strap 62.

In general, the cross strap 62 is attached to the strap clip 50 by urging a single mounting hole 64 of the cross strap 62 over the support hook 54. The remaining length of the cross strap 62 can be routed to and similarly fastened to the strap clips 50 that are attached to the adjacent upright rod assemblies 29. The remaining length of the cross strap 62 can also be looped around a branch or fruit to be supported then attached to the same support hook 54 of the strap clip 50 that the first cross strap 62 attachment was made. The plurality of mounting holes 64 disposed in the cross strap 62 allows a user to adjust a diameter of a loop created by the cross strap 62 as well as to control the horizontal distance of the cross strap 62 between adjacent upright rod assemblies 29.

Figure 10:
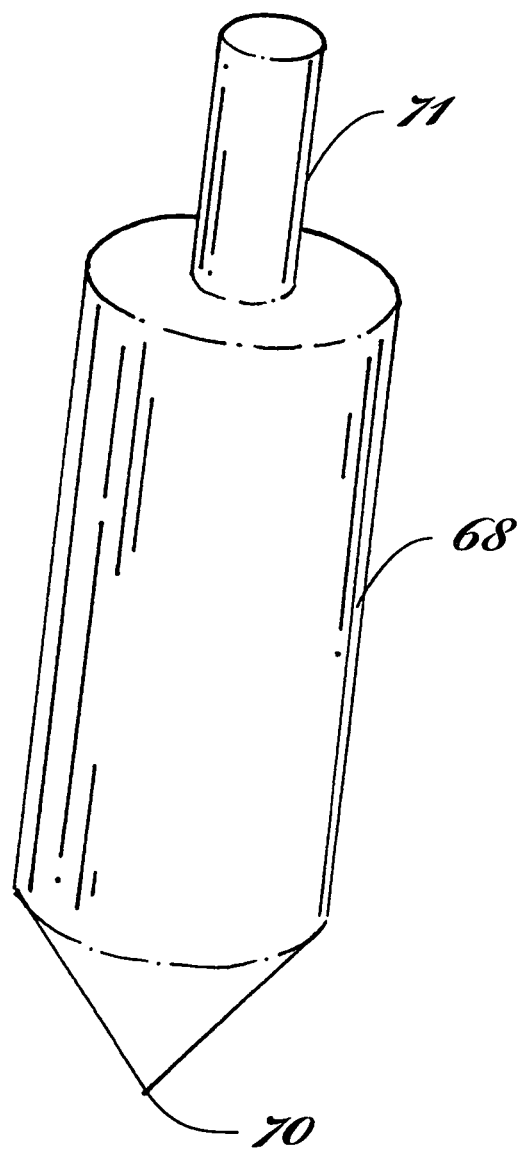
FIG. 10 is a view in perspective of a soil tip for optional use with the upright rod assemblies of FIG. 1.

Referring to FIG. 10, the soil point 68 is shown that includes an extending portion 71 and point 70 (described in greater detail hereinafter) that is elliptical or oval in shape. The soil point 68 is preferably made of solid material, and ideally of the same material (i.e., plastic) as are the upright and horizontal rod assemblies 29, 12 formed. Ideally, the extending portion 71 includes the same size (i.e., diameter) as that of the inner rod 26.

The elliptical or oval shaped extending portion 71 of the soil tip 68 is aligned with the elliptical or oval shape of the center bore 21 of the outer rod 28 and is then inserted into the center bore 21 of the outer rod 28. The outer rod 28 is then rotated while the soil tip 68 is held stationary to produce the binding effect previously described for securing together the inner and outer rods 26, 28 of the upright rod assembly 29.

Figure 11:
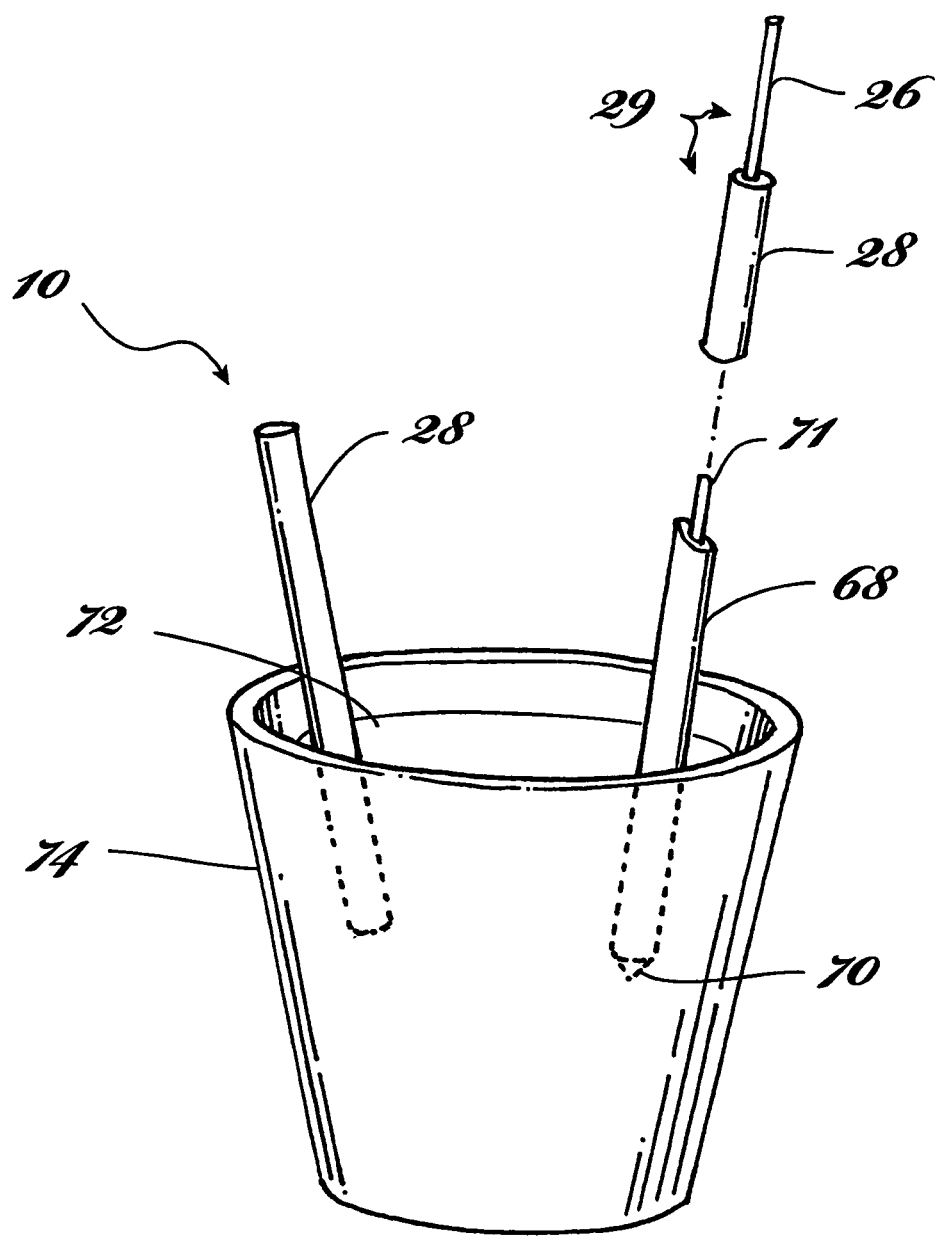
FIG. 11 is a view in perspective of the soil tip and an upright post inserted in a pot containing soil of the plant support system of FIG. 1.

Referring to FIG. 11, the soil tip 68 is shown staked in a pot 74 containing the soil 72 that illustrates a preferred use of the soil tip 68. The soil tip 68 includes a point 70 that is used to enable the soil tip 68 to be urged directly into the soil 72. The extending portion 71 of the soil tip 68 is preferably left exposed above the soil 72 to accept the attachment of the upright rod assembly 29, as previously described. If desired, the outer rod 28 of the upright rod assembly 29 can be attached to the extending portion 71 before insertion of the soil tip 68 into the soil 72.

The plant support system 10 is especially well suited for fast growing plants 11 due to the wide range of adjustment provided by the upright rod assembly 29 and the horizontal rod assembly 12. If desired, the upright rod assembly 29 can be mounted onto a pivoting base clamp (not shown) that is attached to a rim of a planting vessel (i.e., the pot 74). The upright rod assembly 29 can also be staked directly into the soil 72 as shown in FIG. 11.

An unexpected benefit from the invention is the compatibility of the pole clips 22 of the plant support system 10 for use with a variety of existing plant support structures consisting of poles or rods. For example, the pole clips 22 can be attached to any type of cylindrical plant support structure with a diameter similar to that of the upright rod assembly 29.

Another unexpected benefit from the invention is the ability of the irrigation line clip 30, the plant support clip 36, and the tie clip 42 can be used with any cylindrical upright or horizontal support rod structure with a diameter similar to that of the upright rod assembly 29 or the horizontal rod assembly 12.

Another unexpected benefit from the invention is the ability of the strap clip 50 and the cross strap 62 to be used in concert with each'other on any plant support structure with a diameter similar to that of the upright rod assembly 29 or the horizontal support rod assembly 12.

The invention has been shown, described, and illustrated in substantial detail with reference to the presently preferred embodiment. It will be understood by those skilled in this art that other and further changes and modifications may be made without departing from the spirit and scope of the invention which is defined by the claims appended hereto.

What is claimed is:

1. A plant support system for providing support to a plant, comprising:
   (a) a first rod that includes a first longitudinal length; wherein said first rod includes a hollow elliptical or oval center that extends along at least a portion of said first longitudinal length and wherein said hollow elliptical or oval center includes a first inside diameter that extends across a greater inside diameter of said elliptical or oval center and a second inside diameter that extends across a lesser inside diameter of said elliptical or oval center;
   (b) a second rod that includes a second longitudinal length, wherein said second rod includes an elliptical or oval exterior when taken in cross-section that extends along at least a portion of said second longitudinal length, and wherein a first outside diameter extends across a greater outside diameter of said second rod and wherein a second outside diameter extends across a lesser outside diameter of said second rod;
   (c) wherein said first outside diameter is less than said first inside diameter and wherein said second outside diameter is less than said second inside diameter, and wherein said first outside diameter is greater than said second inside diameter;
   (d) wherein when said first outside diameter is in alignment with said first inside diameter and said second outside diameter is in alignment with said second inside diameter, said second rod is able to be inserted into said first rod and wherein said second rod is able to be displaced in said first rod along said first longitudinal length;
   (e) wherein when a portion of said second rod is disposed in a portion of said first rod and said second rod is rotated around a common center longitudinal axis of said first rod and said second rod a sufficient amount, a portion of said first outside diameter of said second rod engages with a portion of said hollow elliptical or oval center of said first rod to create a friction fit between said first rod and said second rod that is sufficient to secure said second rod in position with respect to said first rod;
   (f) wherein a portion of the plant is secured to said first rod or to said second rod;
   (g) wherein said first rod and said second rod forms an upright rod assembly;
   (h) wherein said system includes at least two upright rod assemblies that are disposed in a spaced-apart relationship with respect to each other and at least two clips, wherein a first of said at least two clips is attached to a first of said upright rod assemblies and wherein a second of said at least two clips is attached to a second of said upright rod assemblies;
   (i) wherein said first of said at least two clips and said second of said at least two clips each include a post that protrudes from said first clip and from said second clip and wherein each of said posts includes an elliptical or oval cross-section;
   (j) wherein said post of said first of said at least two clips extends in a direction toward said second of said at least two clips, and wherein said second of said at least two clips is oriented so that said post of said second of said at least two clips extends in a direction toward said first of said at least to clips, and including a horizontal member that extends between said first of said at least two clips and said second of said at least two clips, and including means for securing opposite ends of said horizontal member to said post of said first of said at least two clips and to said post of said second of said at least two clips, said horizontal member comprises a horizontal rod assembly including a pair of inner horizontal rods having an elliptical or oval cross-section and an outer horizontal rod having an elliptical or oval cross-section, at least a portion of said inner horizontal rods being telescopically arranged within said outer horizontal rod at either end and wherein rotation of either of said inner horizontal rods relative to said outer horizontal rod creates a friction fit for securing and adjusting the overall length of the horizontal rod assembly; and
   (k) wherein said means for securing includes a hollow center at said opposite ends of said horizontal member that includes an elliptical or oval cross-section, and wherein a size of said hollow center of said horizontal member is greater than a size of said exterior of said posts sufficient to permit said opposite ends of said horizontal member to be disposed over each of said posts, and wherein when said horizontal member is rotated about a center axis thereof with respect to said posts, said horizontal member is simultaneously secured at each of said opposite ends of said horizontal member to each of said posts.

2. The plant support system of claim 1 wherein when said first outside diameter of said second rod is in alignment with said first inside diameter or said first rod and said second outside diameter of said second rod is in alignment with said second inside diameter of said first rod, said upright rod assembly is disposed in a first position, and wherein when said portion of said second rod is disposed in said portion of said first rod and said second rod is rotated around said common center longitudinal axis of said first rod and said second rod a sufficient amount, and said portion of said first outside diameter of said second rod is engaged with a portion of said hollow elliptical or oval center of said first rod to create said friction fit between said first rod and said second rod that is sufficient to secure said second rod in position with respect to said first rod, said upright rod assembly is disposed in a second position, and wherein when said upright rod assembly is disposed in said first position said second rod is able to telescope along said center longitudinal axis with respect to said first rod, and wherein when said upright rod assembly is disposed in said second position said second rod is not able to telescope along said center longitudinal axis with respect to said first rod.

3. The plant support system of claim 2 wherein said first rod includes an exterior that is elliptical or oval when taken in cross-section, and wherein said first rod can be inserted into a third rod that includes a sufficiently large hollow elliptical or oval center that extends along at least a portion of a longitudinal length of said third rod and wherein said first rod can be displaced along a longitudinal length of said third rod.

4. The plant support system of claim 2 wherein said second rod includes a hollow interior that is elliptical or oval when taken in cross-section, and wherein a fourth rod that includes a sufficiently small outside greater diameter and a sufficiently small outside lesser diameter can be inserted into said second rod and displaced longitudinally along at least a portion of a longitudinal length of said second rod.

5. The plant support system of claim 2 including an upright post, and wherein said upright post is attached to an object and including means for a bottom of said first rod or a bottom of said second rod cooperating with said upright post sufficient to secure said first rod or said second rod to said upright post relative to said object.

6. The plant support system of claim 5 wherein said means for a bottom of said first rod or a bottom of said second rod cooperating with said upright post includes an exterior of said upright post that is elliptical or oval when taken in cross-section, and wherein said exterior of said upright post extends along at least a portion of a longitudinal length of said upright post, and wherein a portion of said upright post is able to be disposed in said bottom of said first rod.

7. The plant support system of claim 6 wherein when said first rod is rotated with respect to said upright post, a portion of said exterior of said upright post contacts an interior of said bottom of said first rod sufficient to secure said first rod to said upright post.

8. The plant support system of claim 5 wherein said means for a bottom of said first rod or a bottom of said second rod cooperating with said upright post includes a hollow interior of said upright post that is elliptical or oval when taken in cross-section, and wherein said interior of said upright post extends along at least a portion of a longitudinal length of said upright post, and wherein a portion of said bottom of said first rod is able to be disposed in said upright post.

9. The plant support system of claim 2 wherein a bottom portion of said upright rod assembly is inserted directly into the ground.

10. The plant support system of claim 2 including a soil tip and wherein said soil tip includes a pointed or rounded portion at a lower end, thereof and an extending portion attached to an opposite upper end, thereof and wherein a bottom of said first rod is able to be disposed over said extending portion and wherein said soil tip is able to be urged into a soil sufficient to secure said upright rod assembly in position.

11. The plant support system of claim 10 wherein said extending portion of said soil tip includes an elliptical or oval exterior in cross-section and wherein when said first rod is rotated about a common center longitudinal axis with respect to said extending portion a portion of an interior of said first rod binds against an exterior of said extending portion sufficient to retain said first rod to said soil tip.

12. The plant support system of claim 1 wherein said first clip includes a longitudinal gap that is able to expand a sufficient amount to allow said first clip to be urged onto said first rod or said second rod.

13. The plant support system of claim 1 wherein when a first of said pair of inner horizontal rods is radially aligned with respect to said outer horizontal rod said first of said pair of inner horizontal rods is able to telescope with respect to said outer horizontal rod to vary an overall length of said horizontal rod assembly, and wherein when said first of said pair of inner horizontal rods is rotated about a common center longitudinal axis with respect to said outer horizontal rod a portion of an exterior of said first of said pair of inner horizontal rods binds against a portion of an interior of said outer horizontal rod sufficient to prevent said first of said pair of inner horizontal rods from telescoping with respect to said outer horizontal rod.

14. The plant support system of claim 1 including an additional clip that includes a tie-off protrusion that extends from said additional clip and wherein said tie-off protrusion includes a cut-out area that that includes a gap that is widest at a surface of said tie-off protrusion and wherein as said cut-out area progresses inward into said tie-off protrusion, said gap in said cut-out area progressively tapers to a point, and wherein a cord or wire can be placed over said cut-out area and urged downward into said cut-out area until said cord or wire engages with said progressive taper sufficient to secured said cord or wire to said tie-off protrusion to provide additional support for the plant.

15. The plant support system of claim 1 including a cross strap, wherein said cross strap includes a flexible member with three or more spaced-apart holes therein, and including an additional clip that includes a support hook attached thereto, and wherein any of said holes can be urged over said support hook to secure said cross strap to said additional clip, and wherein said cross-strap can be extended horizontally to provide additional support for the plant.

16. A plant support system for providing support to a plant, comprising:
(a) a first rod that includes a first longitudinal length; wherein said first rod includes a hollow elliptical or oval center that extends along at least a portion of said first longitudinal length and wherein said hollow elliptical or oval center includes a first inside diameter that extends across a greater inside diameter of said elliptical or oval center and a second inside diameter that extends across a lesser inside diameter of said elliptical or oval center;
(b) a second rod that includes a second longitudinal length, wherein said second rod includes an elliptical or oval exterior when taken in cross-section that extends along at least a portion of said second longitudinal length, and wherein a first outside diameter extends across a greater outside diameter of said second rod and wherein a second outside diameter extends across a lesser outside diameter of said second rod;
(c) wherein said first outside diameter is less than said first inside diameter and wherein said second outside diameter is less than said second inside diameter, and wherein said first outside diameter is greater than said second inside diameter;
(d) wherein when said first outside diameter is in alignment with said first inside diameter and said second outside diameter is in alignment with said second inside diameter, said second rod is able to be inserted into said first rod and wherein said second rod is able to be displaced in said first rod along said first longitudinal length;
(e) wherein when a portion of said second rod is disposed in a portion of said first rod and said second rod is rotated around a common center longitudinal axis of said first rod and said second rod a sufficient amount, a portion of said first outside diameter of said second rod engages with a portion of said hollow elliptical or oval center of said first rod to create a friction fit between said first rod and said second rod that is sufficient to secure said second rod in position with respect to said first rod;
(f) wherein a portion of the plant is secured to said first rod or to said second rod;
(g) wherein said first rod and said second rod forms an upright rod assembly;

(h) wherein said system includes at least two upright rod assemblies that are disposed in a spaced-apart relationship with respect to each other and at least two clips, wherein a first of said at least two clips is attached to a first of said upright rod assemblies and wherein a second of said at least two clips is attached to a second of said upright rod assemblies;

(i) wherein said first of said at least two clips and said second of said at least two clips each include a post that protrudes from said first clip and from said second clip and wherein each of said posts includes an elliptical or oval cross-section;

(j) wherein said post of said first of said at least two clips extends in a direction toward said second of said at least two clips, and wherein said second of said at least two clips is oriented so that said post of said second of said at least two clips extends in a direction toward said first of said at least to clips, and including a horizontal member that extends between said first of said at least two clips and said second of said at least two clips, and including means for securing opposite ends of said horizontal member to said post of said first of said at least two clips and to said post of said second of said at least two clips, said horizontal member comprises a horizontal rod assembly including a pair of inner horizontal rods having an elliptical or oval cross-section and an outer horizontal rod having an elliptical or oval cross-section, at least a portion of said inner horizontal rods being telescopically arranged within said outer horizontal rod at either end and wherein rotation of either of said inner horizontal rods relative to said outer horizontal rod creates a friction fit for securing and adjusting the overall length of the horizontal rod assembly;

(k) wherein said means for securing includes a hollow center at said opposite ends of said horizontal member that includes an elliptical or oval cross-section, and wherein a size of said hollow center of said horizontal member is greater than a size of said exterior of said posts sufficient to permit said opposite ends of said horizontal member to be disposed over each of said posts, and wherein when said horizontal member is rotated about a center axis thereof with respect to said posts, said horizontal member is simultaneously secured at each of said opposite ends of said horizontal member to each of said posts; and (i) an additional clip that is attached to said first of said upright rod assemblies or to said second of said upright rod assemblies or to said horizontal member, wherein said additional clip includes a tie-off protrusion that extends from said additional clip and wherein said tie-off protrusion includes a cut-out area that that includes a gap that is widest at a surface of said tie-off protrusion and wherein as said cut-out area progresses inward into said tie-off protrusion, said gap in said cut-out area progressively tapers to a point, and wherein a cord or wire can be placed over said cut-out area and urged downward into said cut-out area until said cord or wire engages with said progressive taper sufficient to secure said cord or wire to said tie-off protrusion to provide additional support for the plant.

\* \* \* \* \*